(12) United States Patent
Asano et al.

(10) Patent No.: US 10,626,844 B2
(45) Date of Patent: Apr. 21, 2020

(54) HYDRAULIC DRIVETRAIN, METHOD OF STARTING SAME, POWER GENERATOR AND METHOD OF STARTING SAME

(71) Applicant: MITSUBISHI HEAVY INDUSTRIES, LTD., Tokyo (JP)

(72) Inventors: Shin Asano, Tokyo (JP); Kensuke Futahashi, Tokyo (JP); Yoshitomo Noda, Tokyo (JP); Kyota Tokuyama, Tokyo (JP); Sho Onodera, Tokyo (JP); Yukihito Okuda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 18 days.

(21) Appl. No.: 16/111,916

(22) Filed: Aug. 24, 2018

(65) Prior Publication Data
US 2019/0063397 A1 Feb. 28, 2019

(30) Foreign Application Priority Data

Aug. 25, 2017 (JP) ................................ 2017-162358

(51) Int. Cl.
| | |
|---|---|
| *F03B 17/06* | (2006.01) |
| *F03B 13/22* | (2006.01) |
| *F03B 13/10* | (2006.01) |
| *F03B 15/00* | (2006.01) |
| *F03B 3/04* | (2006.01) |

(52) U.S. Cl.
CPC .............. *F03B 17/061* (2013.01); *F03B 3/04* (2013.01); *F03B 13/10* (2013.01); *F03B 13/22* (2013.01); *F03B 15/005* (2013.01); *F05B 2260/406* (2013.01); *F05B 2260/902* (2013.01)

(58) Field of Classification Search
USPC .................. 290/44, 53, 55; 60/327; 111/174
See application file for complete search history.

(56) References Cited

U.S. PATENT DOCUMENTS

| | | | | |
|---|---|---|---|---|
| 3,640,066 A | * | 2/1972 | Marshall | ............. F16H 61/4157 60/466 |
| 3,864,915 A | * | 2/1975 | Metailler | ................. B66D 1/44 60/468 |
| 4,503,928 A | * | 3/1985 | Mallen-Herrero | .... F04C 2/3448 180/165 |

(Continued)

FOREIGN PATENT DOCUMENTS

| | | |
|---|---|---|
| JP | 2000-341910 | 12/2000 |
| JP | 2013-501868 | 1/2013 |

(Continued)

*Primary Examiner* — Pedro J Cuevas
(74) *Attorney, Agent, or Firm* — Wenderoth, Lind & Ponack, L.L.P.

(57) ABSTRACT

The present invention provides a hydraulic drive train including a check valve provided in a return oil passage disposed between a branching position of a first branching oil passage and a branching position of a second branching oil passage, wherein at the time of starting of startup of the hydraulic drive train, the switching valve is closed, the opening degree of the flow rate adjusting valve is set to the initial opening degree, the on-off valve is opened, the boost pump is driven by the drive motor, and the hydraulic oil is supplied to the hydraulic pump, thereby assisting the rotational speed of the vanes by the hydraulic oil.

8 Claims, 4 Drawing Sheets

(56) References Cited

U.S. PATENT DOCUMENTS

| | | | | |
|---|---|---|---|---|
| 5,937,646 A * | 8/1999 | Zakula | | F15B 11/0426 60/430 |
| 6,170,412 B1 * | 1/2001 | Memory | | A01C 7/081 111/174 |
| 6,182,588 B1 * | 2/2001 | Bodie | | A01C 7/081 111/174 |
| 7,150,150 B2 * | 12/2006 | Bigo | | E02F 9/128 60/468 |
| 7,436,086 B2 * | 10/2008 | McClintic | | F03D 7/0236 290/55 |
| 8,450,868 B2 * | 5/2013 | Tsutsumi | | F03B 13/264 290/44 |
| 8,624,413 B2 * | 1/2014 | Tsutsumi | | F16H 61/431 290/44 |
| 8,668,465 B2 * | 3/2014 | Wadsley | | F04B 1/28 417/216 |
| 8,710,693 B2 * | 4/2014 | Amano | | F03D 7/0248 290/55 |
| 9,080,548 B2 | 7/2015 | Dehlsen et al. | | |
| 9,086,061 B2 * | 7/2015 | Zhang | | F04B 49/002 |
| 9,394,924 B2 * | 7/2016 | Berg | | E02F 9/2242 |
| 9,404,573 B2 * | 8/2016 | Hand | | F16H 61/4139 |
| 9,458,842 B2 * | 10/2016 | Berg | | B60T 10/04 |
| 9,945,396 B2 * | 4/2018 | Shang | | F15B 11/024 |
| 2005/0109026 A1 * | 5/2005 | Bigo | | E02F 9/128 60/468 |
| 2007/0024058 A1 * | 2/2007 | McClintic | | F03D 7/0236 290/44 |
| 2009/0273186 A1 * | 11/2009 | Plant, Jr. | | F03D 9/00 290/44 |
| 2010/0320770 A1 * | 12/2010 | Dahlhaug | | F16H 39/02 290/55 |
| 2010/0322791 A1 * | 12/2010 | Wadsley | | F04B 1/28 417/286 |
| 2011/0109094 A1 * | 5/2011 | Kenway | | F15B 1/024 290/55 |
| 2011/0142596 A1 * | 6/2011 | Nies | | F15B 19/005 415/13 |
| 2011/0272158 A1 * | 11/2011 | Neal | | B67D 7/36 166/305.1 |
| 2012/0061958 A1 * | 3/2012 | Tsutsumi | | F03D 15/20 290/44 |
| 2012/0104752 A1 * | 5/2012 | Tsutsumi | | F03B 13/264 290/44 |
| 2012/0161442 A1 * | 6/2012 | Chapple | | F03D 7/0276 290/44 |
| 2013/0074486 A1 * | 3/2013 | McWethy | | E02F 3/964 60/428 |
| 2013/0076042 A1 * | 3/2013 | Amano | | F03D 80/88 290/55 |
| 2013/0298545 A1 * | 11/2013 | Berg | | E02F 9/2242 60/471 |
| 2014/0020370 A1 * | 1/2014 | Berg | | E02F 9/2242 60/327 |
| 2014/0023523 A1 * | 1/2014 | Berg | | B60T 10/04 417/53 |
| 2014/0150415 A1 * | 6/2014 | Zhang | | F04B 49/002 60/327 |
| 2014/0325971 A1 * | 11/2014 | Hand | | F16H 61/4139 60/327 |
| 2015/0368879 A1 * | 12/2015 | Peterson | | E02F 9/2292 60/413 |
| 2017/0072778 A1 * | 3/2017 | Ornella | | B60K 25/06 |
| 2017/0241445 A1 * | 8/2017 | Shang | | F15B 11/024 |
| 2017/0260962 A1 | 9/2017 | Futahashi et al. | | |
| 2017/0306936 A1 * | 10/2017 | Dole | | F04B 1/066 |
| 2019/0186477 A1 * | 6/2019 | Flemmer | | F04B 17/05 |

FOREIGN PATENT DOCUMENTS

| | | |
|---|---|---|
| WO | 2000-341910 | 12/2000 |
| WO | 2012/073281 | 6/2012 |
| WO | 2016/039290 | 3/2016 |

* cited by examiner

HYDRAULIC DRIVETRAIN, METHOD OF STARTING SAME, POWER GENERATOR AND METHOD OF STARTING SAME

BACKGROUND OF THE INVENTION

Field of the Invention

The present invention relates to a hydraulic drive train, a method of starting the same, a power generator and a method of starting the same.

Priority is claimed on Japanese Patent Application No. 2017-162358, filed Aug. 25, 2017, the content of which is incorporated herein by reference.

Description of Related Art

In recent years, power generators utilizing various natural energies have been developed. For example, a large ocean current such as the Kuroshio Current is also an energy resource, and an ocean current power generator for generating electricity using ocean current energy has been developed.

Patent Document as mentioned below 1 discloses an ocean current power generator including a hydraulic power transmission mechanism (a hydraulic drive train).

Further, Patent Document 1 discloses a hydraulic power transmission mechanism (a hydraulic drive train) which includes a hydraulic pump, a hydraulic motor that is rotated by hydraulic oil supplied from the hydraulic pump, a supply path that sends the hydraulic oil from the hydraulic pump to the hydraulic motor, a return oil passage that returns the hydraulic oil from the hydraulic motor to the hydraulic pump, a switching valve that opens and closes the supply oil passage, a bypass oil passage that allows the hydraulic oil to bypass from an intermediate portion between the hydraulic pump and the switching valve in the supply oil passage to the return oil passage, and a bypass valve that opens and closes the bypass oil passage.

Patent Document 1: WO 2016/039290

Incidentally, in the ocean current power generator disclosed in Patent Document 1, because the rotational speed of vanes at an initial stage at the time of startup is low, the torque generated by the rotation of the vanes is low.

If the torque generated by the vanes is small as described above, it is not possible to obtain the torque required for rotating the vanes due to a mechanical loss such as in a bearing of a rotating shaft to which the vanes are connected or a static friction torque of the hydraulic pump. That is, there is a problem that the startup cannot be performed while the rotation of the vanes is stable.

Therefore, an object of the present invention is to provide a hydraulic drive train, a method of starting the same, a power generator and a method of starting the same capable of performing the startup in the state of stabilizing the rotation of the vanes by compensating for the torque of the vanes in the initial stage of startup.

SUMMARY OF THE INVENTION

A hydraulic drive train of the present invention includes:
a hydraulic pump configured to be rotated by rotation of a first rotating shaft provided with vanes, wherein the first rotating shaft is rotated by the action of the vanes;
a hydraulic motor configured to rotate a second rotating shaft connected to a power generator;
a supply oil passage configured to supply hydraulic oil from the hydraulic pump to the hydraulic motor;
a return oil passage configured to return the hydraulic oil from the hydraulic motor to the hydraulic pump;
a bypass oil passage configured to connect the return oil passage to the supply oil passage;
a switching valve provided in a portion of the supply oil passage located to be closer to the hydraulic motor side than a connection position between the supply oil passage and the bypass oil passage;
a flow rate adjusting valve provided in the bypass oil passage;
an oil tank configured to store the hydraulic oil therein;
a first branching oil passage which is branched from a portion of the return oil passage located to be closer to the hydraulic pump side than a connection position between the return oil passage and the bypass oil passage, and has a distal end reaching the hydraulic oil stored in the oil tank;
a boost pump which is provided in the first branching oil passage and is configured to supply hydraulic oil from the oil tank at a predetermined pressure;
a drive motor configured to drive the boost pump;
a second branching oil passage which is branched from a portion of the return oil passage located to be closer to the hydraulic motor side than a branching position of the first branching oil passage, and has a distal end reaching the hydraulic oil stored in the oil tank;
an on-off valve provided in the second branching oil passage and configured to be capable of closing the second branching oil passage; and
a check valve provided in the return oil passage located between the branching position of the first branching oil passage and the branching position of the second branching oil passage.

According to the present invention, by including the hydraulic pump, the hydraulic motor, the supply oil passage, the return oil passage, the bypass oil passage, the switching valve, the flow rate adjusting valve, the oil tank, the first branching oil passage, the boost pump, the drive motor, the second branching oil passage, the on-off valve, and the relief valve, when starting the startup of the hydraulic drive train, by setting the state in which the switching valve is closed and the on-off valve is open, and by supplying the hydraulic oil of the oil tank to the hydraulic pump with the boost pump, it is possible to rotate the first rotating shaft with rotation of the vanes.

In other words, since the hydraulic pump to which the hydraulic oil is supplied can be made to function as a motor for rotating the first rotating shaft, it is possible to set the torque generated by the vanes in the initial stage at the time of startup to be greater than the required torque. Since this makes it possible to compensate for the torque of the vanes in the initial stage at the time of startup, it is possible to perform the startup with the rotation of the vanes stabilized.

Further, by closing the switching valve and by opening the on-off valve, it is possible to recover the hydraulic oil supplied to the hydraulic motor into the oil tank.

Further, by providing the check valve, it is possible for supply of the hydraulic oil supplied by the boost pump to the hydraulic motor side of the return oil passage at the time of startup to be suppressed.

As a result, since a sufficient amount of hydraulic oil can be supplied to the hydraulic pump in the initial stage at the time of startup, the torque generated by the rotation of the vanes can be set to be sufficiently greater than the required torque. Also, by utilizing the check valve, there is no need for opening and closing control of the valve.

Further, the hydraulic drive train of the present invention may further include a third branching oil passage which branches from a position of the return oil passage between the branching position of the first branching oil passage and the hydraulic pump, and has a distal end reaching the hydraulic oil stored in the oil tank; and a relief valve which is provided in the third branching oil passage and is configured to open when reaching a predetermined pressure, and the relief valve may be configured to be able to switch the predetermined pressure between a low-pressure setting and a high-pressure setting depending on an operating state.

By having the relief valve configured as described above, it is possible to set the relief valve to a high pressure in the initial stage at the time of startup and to keep the oil passage between the boost pump and the hydraulic pump at a high pressure. Since this makes it possible to stably supply high-pressure hydraulic oil to the hydraulic pump, it is possible to enhance the function of the hydraulic pump as a motor.

Further, at the time of normal operation, by setting the relief valve to a low pressure, the load on the first branching oil passage can be reduced. Thus, since it is not necessary to provide a boost pump having a large capacity, power consumption of the hydraulic drive train can be suppressed.

Further, the hydraulic drive train of the present invention may further include a control device electrically connected to the switching valve, the flow rate adjusting valve, and the on-off valve, the control device may perform control of closing the switching valve and opening the on-off valve at the time of starting of startup, and may perform a control of setting the relief valve to a high pressure, and the control device may perform a control of opening the switching valve and closing the on-off valve at the time of normal operation after startup, and may perform a control of switching the relief valve to a low-pressure setting.

By providing the control device with such a configuration, at the time of starting of startup, by performing the control of closing the switching valve and opening the on-off valve using the control device, and by performing the control of setting the relief valve to the high pressure, it is possible to increase the pressure in the oil passage between the boost pump for supplying the hydraulic oil and the hydraulic pump. As a result, since the torque assist due to the boost pump is added to the torque generated by the rotation of the vanes, the torque can be set to be greater than the required torque.

Further, at the time of normal operation, by switching the relief valve to the low-pressure setting using the control device, the load on the first branching oil passage can be reduced. Thus, since it is not necessary to prepare a boost pump having a large capacity, the power consumption of the hydraulic drive train can be suppressed.

Further, a power generator of the present invention includes the hydraulic drive train; the vanes configured to be rotated by a fluid; a mechanical brake configured to restrict a rotation of the vanes; the first rotating shaft configured to be rotate together with the vanes; the power generator connected to one end of the second rotating shaft; and the second rotating shaft having the other end connected to the hydraulic motor, wherein the hydraulic drive train is disposed between the first rotating shaft and the second rotating shaft.

In the power generator of the present invention, the vanes may be rotated by an ocean current.

In this way, by rotating the vanes with an ocean current, it is possible to use the power generator as an ocean current power generator.

A method of starting a hydraulic drive train, wherein the hydraulic drive train includes a hydraulic pump configured to be rotated by rotation of a first rotating shaft provided with vanes, wherein the first rotating shaft is rotated by the action of the vanes; a hydraulic motor configured to rotate a second rotating shaft connected to a power generator; a supply oil passage configured to supply hydraulic oil from the hydraulic pump to the hydraulic motor; a return oil passage configured to return the hydraulic oil from the hydraulic motor to the hydraulic pump; a bypass oil passage configured to conned the return oil passage to the supply oil passage; a switching valve provided in a portion of the supply oil passage located to be closer to the hydraulic motor side than a connection position with the bypass oil passage; a flow rate adjusting valve provided in the bypass oil passage; an oil tank configured to store the hydraulic oil therein; a first branching oil passage which is branched from a portion of the return oil passage located to be closer to the hydraulic pump side than a connection position with the bypass oil passage, and has a distal end reaching the hydraulic oil stored in the oil tank; a boost pump which is provided in the first branching oil passage and is configured to supply the hydraulic oil from the oil tank at a predetermined pressure; a drive motor configured to drive the boost pump; a second branching oil passage which is branched from a portion of the return oil passage located to be closer to the hydraulic motor side than a connection position with the boost pump, and has a distal end reaching the hydraulic oil stored in the oil tank; an on-off valve provided in the second branching oil passage and configured to be capable of closing the second branching oil passage; and a check valve provided in the return oil passage located between the branching position of the first branching oil passage and the branching position of the second branching oil passage, the method including:

a first step of closing the switching valve, setting an opening degree of the flow rate adjusting valve to an initial opening degree and opening the on-off valve at the time of starting of startup of the hydraulic drive train;

a second step of driving the boost pump by the drive motor and supplying hydraulic oil to the hydraulic pump to assist the rotational speed of the vanes with the hydraulic oil;

a third step of controlling the rotational speed of the vanes by adjusting the opening degree of the flow rate adjusting valve;

a fourth step of setting the rotational speed of the vanes to a rotational speed at the time of the normal operation, when the rotational speed of the vanes except the assistance of the rotational speed of the vanes reaches a rotational speed exceeding a required torque; and a fifth step of closing the on-off valve and opening the switching valve to start the normal operation.

According to the present invention, by supplying the hydraulic oil of the oil tank to the hydraulic pump by the boost pump, the hydraulic pump supplied with the hydraulic oil can be made to function as a motor for rotating the first rotating shaft.

Since this increases the rotational speed of the vanes rotating together with the first rotating shaft, the torque generated by the vanes in the initial stage at the time of startup can be set to be greater than the required torque. In other words, by compensating for the torque of the vanes in the initial stage at the time of startup, it is possible to perform startup with the rotation of the vanes stabilized.

Further, in the method of starting the hydraulic drive train of the present invention, the hydraulic drive train may include a third branching oil passage which is branched from a position of the return oil passage between a branching position of the second branching oil passage and the hydraulic pump, and has a distal end reaching the hydraulic oil stored in the oil tank, and a relief valve which is provided in the third branching oil passage and configured to open the third branching oil passage when reaching a predetermined pressure, and wherein a control of setting the relief valve to high pressure is performed in the first step, and a control of switching the relief valve to low-pressure setting is performed in the fifth step.

In this manner, by performing the control of setting the relief valve to the high pressure in the first step, it is possible to set the oil passage between the boost pump for supplying the hydraulic oil and the hydraulic pump to have a high pressure. As a result, the torque generated by the rotation of the vanes can be set to be greater than the required torque.

Further, a method of starting the power generator of the present invention including the method of starting the hydraulic drive train may include a step of releasing a mechanical brake for restricting a rotation of the vanes between the first step and the second step.

In this way, by including the step of releasing the mechanical brake for restricting the rotation of the vanes between the first step and the second step, it is possible to set the vanes to a rotatable state.

According to the present invention, by compensating for the torque of the vanes in the initial stage at the time of startup, it is possible to perform startup, while the rotation of the vanes is stabilized.

DETAILED DESCRIPTION OF THE INVENTION

Hereinafter, embodiments to which the present invention is applied will be described in detail with reference to the drawings.

Embodiment

Figure 1:
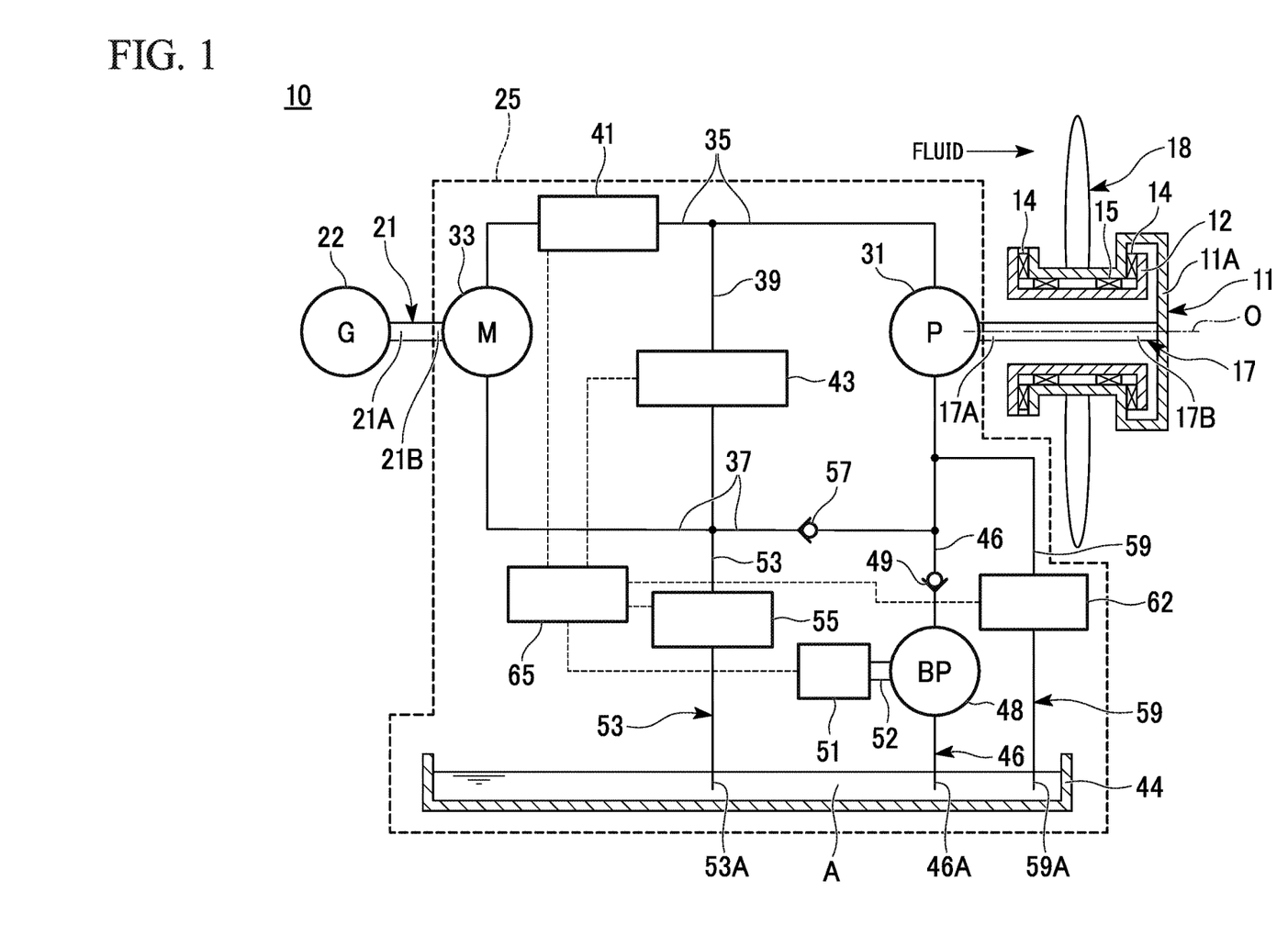
FIG. 1 is a diagram showing a schematic configuration of a power generator according to an embodiment of the present invention.

A power generator 10 according to an embodiment of the present invention will be described with reference to FIG. 1. In FIG. 1, symbol O represents an axis of the first rotating shaft 17 (hereinafter referred to as an "axis O").

The power generator 10 of the present embodiment includes a rotating member 11, a fixing member 12, a thrust bearing 14, a radial bearing 15, a first rotating shaft 17, a plurality of vanes 18, a mechanical brake (not shown in FIG. 1, a mechanical brake 75 shown in FIG. 2), a rotational speed detection unit (not shown in FIG. 1, a rotational speed detection unit 81 shown in FIG. 2), a flow speed detection unit (not shown in FIG. 1, a flow speed detection unit 82 shown in FIG. 2), a second rotating shaft 21, a power generator 22, and a hydraulic drive train 25.

The rotating member 11 is a cylindrical member disposed outside the fixing member 12 and extends in a direction of the axis O. The axis of the rotating member 11 coincides with the axis O. The rotating member 11 has a portion facing the fixing member 12 in the direction of the axis O, a portion facing the fixing member 12 in a radial direction, and an end plate 11A constituting one end of the rotating member 11. The rotating member 11 is a member that rotates about the axis O.

The fixing member 12 is disposed inside the rotating member 11 in a state of being interposed in a gap between the fixing member 12 and the rotating member 11. The fixing member 12 is a cylindrical member extending in the direction of the axis O. The axis of the fixing member 12 substantially coincides with the axis O.

The thrust bearing 14 is disposed between the rotating member 11 and the fixing member 12. The thrust bearing 14 is disposed at both ends of the fixing member 12 in the direction of the axis O. The thrust bearing 14 is a bearing for receiving a force (thrust force) acting in a thrust direction (the direction of the axis O in FIG. 1).

The radial bearing 15 is provided between the rotating member 11 and the fixing member 12 located between the pair of thrust bearings 14. The radial bearing 15 is a bearing for receiving force (radial force) acting in the radial direction.

The first rotating shaft 17 extends in the direction of the axis O and has one end 17A and the other end 17B. One end 17A of the first rotating shaft 17 is connected to a hydraulic pump 31 constituting the hydraulic drive train 25. The other end 17B of the first rotating shaft 17 is connected to the inside of the end plate 11A of the rotating member 11. Thus, as the rotating member 11 rotates, the first rotating shaft 17 rotates about the axis O.

Each of the vane 18 is fixed to the outside of the rotating member 11. The vanes 18 are rotatable about the axis O by receiving the fluid. As the vanes 18 are rotated, accordingly the first rotating shaft 17 is rotated.

For example, it is possible to use a two vanes with a phase difference of 180°. A number of the vanes 18 is not limited to two. As the vanes 18 of the present invention, for example, three or more vanes may be used.

As the vane 18, for example, it is preferable to use a pitch angle fixed vane (a vane having a simple structure) in which the pitch angle of the blade is fixed. In this manner, by using pitch angle fixed vanes in which the pitch angle of the blade is fixed as the vane 18, the frequency of maintenance can be reduced. Therefore, this is particularly effective when the power generator 10 is an ocean current power generator.

A mechanical brake (not shown) is a brake for restricting the rotation of the vanes 18 so that the vane 18 does not rotate.

A rotational speed detection unit (not shown) detects the rotational speed of the vanes 18. The rotational speed detection unit is electrically connected to the control device 65. The rotational speed detection unit transmits the data on the detected rotational speed of the vanes 18 to the control device 65 (specifically, a determination unit 85 shown in FIG. 2).

A torque detection unit (not shown) detects the torque generated by the rotation of the vanes 18. The torque detection unit is electrically connected to the control device 65. The torque detection unit transmits the data on the detected torque of the vanes 18 to the control device 65 (specifically, the determination unit 85 shown in FIG. 2).

The second rotating shaft 21 extends in one direction, and has one end 21A and the other end 21B. One end 21A of the second rotating shaft 21 is connected to the power generator 22. The other end 21B of the second rotating shaft 21 is connected to the hydraulic motor 33. Therefore, when the hydraulic motor 33 rotates the second rotating shaft 21, power generation is started in the power generator 22.

The hydraulic drive train 25 has a hydraulic pump 31, a hydraulic motor 33, a supply oil passage 35, a return oil passage 37, a bypass oil passage 39, a switching valve 41, a flow rate adjusting valve 43, an oil tank 44, a first branching oil passage 46, a boost pump 48, a check valve 49, a drive motor 51, a second branching oil passage 53, an on-off valve 55, a check valve 57, a third branching oil passage 59, a relief valve 62, and a control device 65.

The hydraulic pump 31 is a pump that rotates together with the first rotating shaft 17 when the first rotating shaft 17 rotates by rotation of the vanes 18. The hydraulic pump 31 supplies hydraulic oil to the hydraulic motor 33 by rotating.

The hydraulic motor 33 is driven by being supplied with the hydraulic oil by the hydraulic pump 31 and rotates the second rotating shaft 21.

One end of the supply oil passage 35 is connected to an outlet side of the hydraulic pump 31, and the other end thereof is connected to an inlet side of the hydraulic motor 33. The supply oil passage 35 is an oil passage for supplying the hydraulic oil from the hydraulic pump 31 to the hydraulic motor 33.

One end of the return oil passage 37 is connected to the outlet side of the hydraulic motor 33 and the other end thereof is connected to the inlet side of the hydraulic pump 31. The return oil passage 37 is an oil passage for returning the hydraulic oil from the hydraulic motor 33 to the hydraulic pump 31.

The bypass oil passage 39 is an oil passage branching from the supply oil passage 35 and is connected to the return oil passage 37. The bypass oil passage 39 is an oil passage for bypassing the hydraulic motor 33 and the switching valve 41, and connects together the supply oil passage 35 and the return oil passage 37.

The switching valve 41 is provided in a portion of the supply oil passage 35 located between the branching position of the bypass oil passage 39 and the hydraulic motor 33. That is, the switching valve 41 is provided in a portion of the supply oil passage 35 located to be closer to the hydraulic motor 33 than a connection position between the supply oil passage 35 and the bypass oil passage 39. The switching valve 41 is electrically connected to the control device 65. The switching valve 41 is controlled by the control device 65. The switching valve 41 is closed at the time of startup and is opened at the time of normal operation after completion of startup.

In a state in which the switching valve 41 is closed, the hydraulic oil is not supplied to the hydraulic motor 33. On the other hand, in the state in which the switching valve 41 is open, the hydraulic oil is supplied to the hydraulic motor 33, and power generation is performed by the power generator 22.

The flow rate adjusting valve 43 is provided in the bypass oil passage 39. The flow rate adjusting valve 43 is electrically connected to the control device 65. The flow rate adjusting valve 43 is controlled by the control device 65. The opening degree of the flow rate adjusting valve 43 is adjusted when adjusting the rotational speed of the hydraulic motor 33 (the rotational speed of the power generator 22) at the time of normal operation.

For example, when the rotational speed of the hydraulic motor 33 is higher than a desired rotational speed, by increasing the opening degree of the flow rate adjusting valve 43, the amount of the hydraulic oil flowing in the hydraulic motor 33.

On the other hand, when the rotational speed of the hydraulic motor 33 is lower than the desired rotational speed, by decreasing the opening degree of the flow rate adjusting valve 43, the amount of hydraulic oil flowing in the hydraulic motor 33 is increased.

The oil tank 44 is a tank in which the hydraulic oil A is stored.

The first branching oil passage 46 branches from a portion located to be closer to the side of the hydraulic pump 31 than a connection position between the return oil passage 37 and the bypass oil passage 39, and a distal end 46A reaches the hydraulic oil A stored in the oil tank 44.

The boost pump 48 is provided in the first branching oil passage 46. The boost pump 48 supplies the hydraulic oil from the oil tank 44 to the return oil passage 37 at a predetermined pressure.

The boost pump 48 is a constantly driven pump. The boost pump 48 supplies the hydraulic oil A in the oil tank 44 to the return oil passage 37 when the hydraulic oil circulating in a circulation oil passage including the supply oil passage 35 and the return oil passage 37 decreases due to leakage or the like.

The check valve 49 is provided in a portion of the first branching oil passage 46 located between the branching position of the first branching oil passage 46 and the boost pump 48. The check valve 49 is a valve for moving the hydraulic oil only in the direction from the boost pump 48 to the hydraulic pump 31. By providing such a check valve 49, backflow of hydraulic oil to the boost pump 48 side can be suppressed.

The drive motor 51 is connected to the boost pump 48 by passing through the third rotating shaft 52. The drive motor 51 is a motor for driving the boost pump 48. The drive motor 51 is electrically connected to the control device 65. The drive motor 51 drives the boost pump 48 at the time of startup and at the time of normal operation.

The second branching oil passage 53 is an oil passage of the return oil passage 37 that branches from a portion located to be closer to the side of the hydraulic motor 33 than the branching position of the first branching oil passage 46. The distal end 53A of the second branching oil passage 53 reaches the hydraulic oil A stored in the oil tank 44.

The on-off valve 55 is provided in the second branching oil passage 53. The on-off valve 55 is electrically connected to the control device 65. The opening and closing of the on-off valve 55 is controlled by the control device 65. The on-off valve 55 is opened at the time of starting, and is closed at the time of normal operation.

The check valve 57 is provided in the return oil passage 37 located between the branching position of the first branching oil passage 46 and the branching position of the second branching oil passage 53. As the check valve 57, a valve which allows hydraulic oil to flow in a direction from the branching position of the second branching oil passage 53 to the branching position of the first branching oil passage 46 is used.

By providing the check valve 57 at such a position, it is possible to suppress the supply of the hydraulic oil by the boost pump 48 to the hydraulic motor 33 side of the return oil passage 37. As a result, a sufficient amount of hydraulic oil can be supplied to the hydraulic pump 31 in the initial stage of startup, and since torque assist due to the boost pump 48 is added to the torque generated by the vanes 18, it is possible to make the torque sufficiently larger than required torque (torque required for starting).

The third branching oil passage 59 branches from between the branching position of the first branching oil passage 46 and the hydraulic pump 31 in the return oil passage 37. The distal end 59A of the third branching oil passage 59 reaches the hydraulic oil A stored in the oil tank 44.

The relief valve 62 is provided in the third branching oil passage 59. The relief valve 62 is a valve configured to open when reaching a predetermined pressure. The relief valve 62 is electrically connected to the control device 65. The relief valve 62 is configured to be capable of switching the predetermined pressure between the low-pressure setting and the high-pressure setting, depending on the operating state (specifically, at the time of startup or at the time of normal operation).

Figure 2:
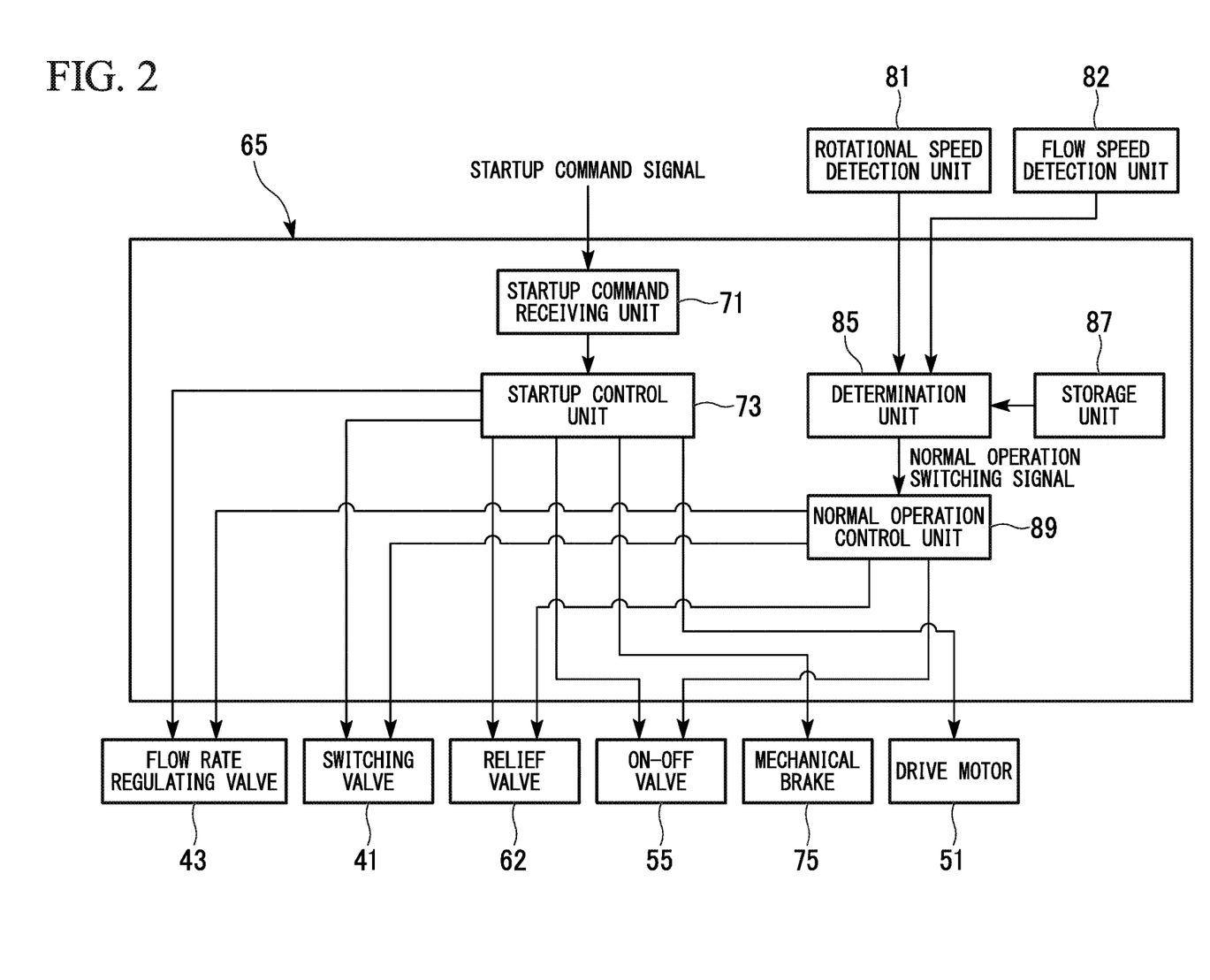
FIG. 2 is a functional block diagram of the control device shown in FIG. 1.

Next, the control device 65 will be described with reference to FIGS. 1 and 2. In FIG. 2, the same components as the structure shown in FIG. 1 are denoted by the same reference numerals.

The control device 65 includes a startup command receiving unit 71, a startup control unit 73, a determination unit 85, a storage unit 87, and a normal operation control unit 89.

The startup command receiving unit 71 is electrically connected to the startup control unit 73. The startup command receiving unit 71 is a portion that receives a startup command of the hydraulic drive train 25. When receiving the startup command of the hydraulic drive train 25, the startup command receiving unit 71 transmits a signal to the startup control unit 73 to perform a control necessary for the startup.

The startup control unit 73 is electrically connected to the switching valve 41, the flow rate adjusting valve 43, the drive motor 51, the on-off valve 55, the relief valve 62, and the mechanical brake 75.

Upon receiving the signal from the startup command receiving unit 71, the startup control unit 73 controls the switching valve 41, the flow rate adjusting valve 43, the drive motor 51, the on-off valve 55, the relief valve 62, and the mechanical brake 75.

Specifically, the startup control unit 73 is configured to perform a control of closing the switching valve 41, setting the opening degree of the flow rate adjusting valve 43 to an initial opening degree, setting the setting of the relief valve to the high-pressure setting, and opening the on-off valve 55 to obtain a state required for startup.

The determination unit 85 is electrically connected to the rotational speed detection unit 81, the flow speed detection unit 82, the storage unit 87, and the normal operation control unit 89. The determination unit 85 receives data on the rotational speed of the vanes 18 from the rotational speed detection unit 81, and receives data on the flow speed of flow from the flow speed detection unit 82.

The determination unit 85 determines whether or not the rotational speed of the vanes 18 has reached the rotational speed exceeding the required torque stored in the storage unit 87, on the basis of the received rotational speed of the vanes 18 and the flow speed of the fluid.

When the determination unit 85 determines that the rotational speed exceeds the required torque, a normal operation switching command is transmitted to the normal operation control unit 89 from the determination unit 85.

The storage unit 87 is electrically connected to the determination unit 85. Information on the required torque acquired in advance and the rotational speed of the vanes 18 is stored in the storage unit 87.

The normal operation control unit 89 is electrically connected to the switching valve 41, the flow rate adjusting valve 43, the on-off valve 55, and the relief valve 62.

Upon receiving the normal operation switching command from the determination unit 85, the normal operation control unit 89 controls the switching valve 41, the flow rate adjusting valve 43, the on-off valve 55, and the relief valve 62 to switch to the normal operation.

Specifically, the relief valve 62 is switched from the high-pressure setting to the low-pressure setting, the on-off valve 55 is closed, and the switching valve 41 is opened. As a result, the normal operation is started.

The hydraulic drive train 25 according to the present embodiment includes the hydraulic pump 31, the hydraulic motor 33, the supply oil passage 35, the return oil passage 37, the bypass oil passage 39, the switching valve 41, the flow rate adjusting valve 43, the oil tank 44, the first branching oil passage 46, the boost pump 48, the drive motor 51, the second branching oil passage 53, the on-off valve 55, and the relief valve 62. Thus, when starting the startup of the hydraulic drive train 25, by setting the state in which the switching valve 41 is closed and the on-off valve 55 is opened, and by supplying the hydraulic oil A of the oil tank 44 to the hydraulic pump 31 by the boost pump 48, it is possible to rotate the first rotating shaft 17 rotated by the vanes 18.

In other words, the hydraulic pump 31 to which the hydraulic oil is supplied can be made to function as a motor for rotating the first rotating shaft 17, and since torque assist due to the boost pump 48 is added to the torque generated by the vanes 18 in the initial stage at the time of startup, it is possible to set the torque to be greater than the required torque. Since this makes it possible to compensate for the torque of the vanes 18 in the initial stage at the time of startup, it is possible to perform startup with the rotation of the vanes 18 stabilized.

Further, by closing the switching valve 41 and by opening the on-off valve 55, it is possible to recover the hydraulic oil supplied to the hydraulic motor 33 into the oil tank 44.

Further, by providing the check valve 57 between the branching position of the first branching oil passage 46 and the branching position of the second branching oil passage 53 in the return oil passage 37, it is possible to prevent the hydraulic oil supplied by the boost pump 48 from being supplied to the hydraulic motor 33 side of the return oil passage 37.

As a result, since a sufficient amount of hydraulic oil can be supplied to the hydraulic pump 31 in the initial stage of startup, it is possible to sufficiently compensate for the torque of the vanes 18 in the initial stage at the time of startup.

Further, by including a third branching oil passage 59 which branches off between the branching position of the second branching oil passage 53 and the hydraulic pump 31 in the return oil passage 37 and has a distal end reaching the hydraulic oil A stored in the oil tank 44, and a relief valve 62 which is provided in the third branching oil passage 59 and can be switched between the low-pressure setting and the high-pressure setting depending on the operating state, by setting the relief valve 62 to the high-pressure setting in the initial stage at the time of startup, it is possible to keep the oil passage between the boost pump 48 and the hydraulic pump 31 at a high pressure.

As a result, since it is possible to stably supply high-pressure hydraulic oil to the hydraulic pump 31, it is possible enhance the function of the hydraulic pump 31 as a motor.

Further, by setting the relief valve 62 to the low-pressure setting at the time of normal operation, since the load of the first branching oil passage 46 can be reduced, it is possible to suppress the power consumption of the hydraulic drive train 25.

Further, by providing the above-described control device 65, and at the time of beginning of startup, by performing a control of closing the switching valve 41 and opening the on-off valve 55, and by performing a control of setting the relief valve 62 to high-pressure setting, it is possible to increase the pressure in the oil passage between the boost pump 48 for supplying the hydraulic oil and the hydraulic pump 31. As a result, the torque generated by the rotation of the vanes 18 can be set to be greater than the required torque.

Further, at the time of the normal operation in which the rotational speed of the vanes 18 is set to the predetermined rotational speed, by switching the relief valve 62 to the low-pressure setting using the control device 65, since it is possible to reduce the load on the first branching oil passage 46, the power consumption of the hydraulic drive train 25 can be suppressed.

The power generator 10 of the present embodiment is particularly effective when applied to an ocean current power generator, but can also be applied to a power generator other than the ocean current power generator.

Next, a starting method of the power generator 10 of the present embodiment will be described with reference to FIGS. 1 to 4. Incidentally, in explaining the starting method of the power generator 10 of the present embodiment, the starting method of the hydraulic drive train 25 of the present embodiment will be described.

Figure 4:
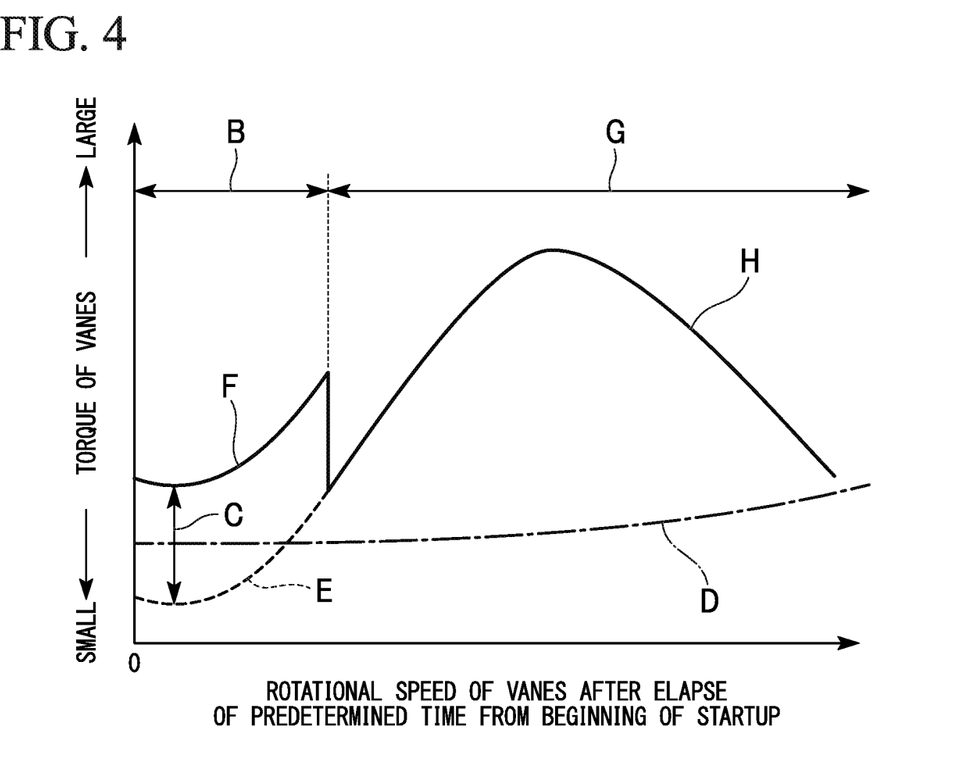
FIG. 4 is a graph showing a relationship between the rotational speed of the vanes and the torque of the vanes after elapse of a predetermined time from the beginning of startup.

In FIG. 4, B represents a period (hereinafter referred to as an "initial stage B at the time of startup") which assists the torque of the vanes 18, C represents a torque amount (hereinafter referred to as a "torque amount C") of the initial stage B assisted using the hydraulic drive train 25, D is a required torque (hereinafter referred to as a "required torque D") required for startup, E is a vane generating torque (hereinafter referred to as a "vane generating torque E") in the initial stage B when there is no torque assist due to the hydraulic drive train 25, F is a vane generating torque (hereinafter referred to as a "vane generating torque F") of the initial stage B when there is a torque assist due to the hydraulic drive train 25, G is a period of the normal operation (hereinafter referred to as a "normal operation period G"), and H represents a vane generating torque of the normal operation period G (hereinafter referred to as a "vane generating torque H").

Figure 3:
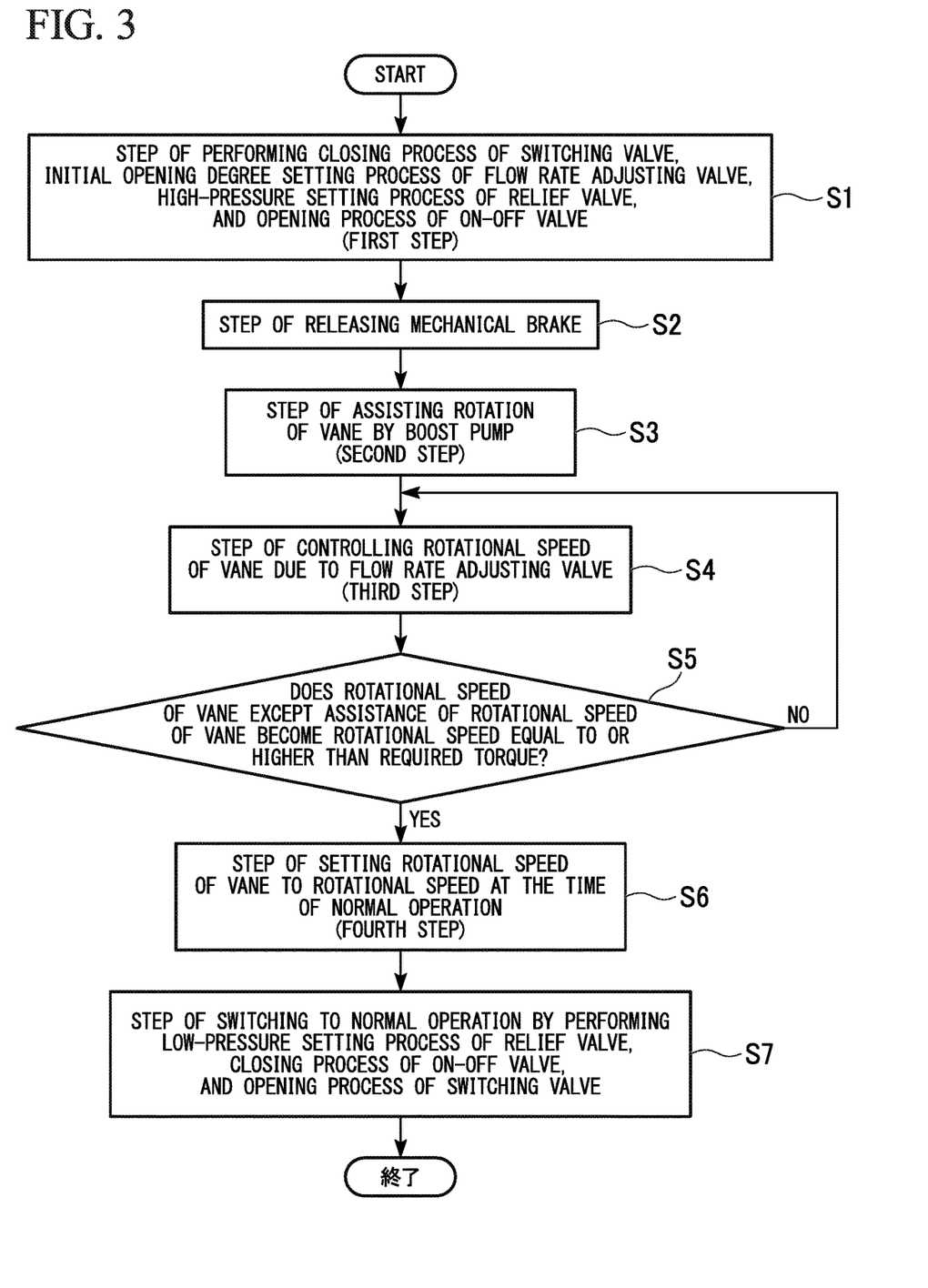
FIG. 3 is a flowchart showing a starting method of the power generator according to an embodiment of the present invention.

When the process shown in FIG. 3 is started, in S1, at the time of beginning of startup the hydraulic drive train 25, the control device 65 is configured to perform the closing process of the switching valve 41, the process of setting the opening degree of the flow rate adjusting valve 43 to the initial opening degree, the high-pressure setting process of the relief valve 62, and the opening process of the on-off valve 55 (a first step).

Specifically, in S1, the following processing is performed. Initially, a startup command signal is input to the startup command receiving unit 71. Next, the startup command receiving unit 71 transmits a signal to the startup control unit 73 to perform a control required for startup.

Thereafter, the startup control unit 73 is configured to perform a closing process of the switching valve 41, an initial opening degree setting process of the opening degree of the flow rate adjusting valve 43, a high-pressure setting process of the relief valve 62, and an opening process of the on-off valve 55.

Next, in S2, a process of releasing the mechanical brake 75 is performed by the startup control unit 73 that has received the signal from the startup command receiving unit 71. Thus, the vanes 18 are in a rotatable state.

Next, in S3, the boost pump 48 is driven by the drive motor 51 to supply the hydraulic oil A to the hydraulic pump 31, thereby assisting the rotational speed of the vanes 18 in the initial stage B (a second step).

In this way, by driving the boost pump 48 to supply the hydraulic oil A to the hydraulic pump 31, it is possible to make the hydraulic pump 31 supplied with the hydraulic oil function as a motor for rotating the first rotating shaft 17. This makes it possible to set the vane generating torque F generated by the vanes 18 in the initial stage B at the time of startup to be greater than the required torque D.

The vane generating torque F is a torque obtained by adding the torque amount C to the vane generating torque E when there is no assistance of the rotational speed of the vanes 18.

Next, in S4, the rotational speed of the vanes 18 is controlled by adjusting the opening degree of the flow rate adjusting valve 43 (a third step).

Next, in S5, a determination is made as to whether the rotational speed of the vanes 18 except the assistance of the rotational speed of the vanes 18 has reached the rotational speed equal to or higher than the required torque D.

Specifically, on the basis of the data on the rotational speed of the vanes 18 transmitted from the rotational speed detection unit 81, the data on the flow speed of the fluid transmitted from the flow speed detection unit 82, and the required torque D stored in the storage unit 87, the determination unit 85 determines whether or not the received rotational speed of the vanes 18 has reached the rotational speed exceeding the required torque D.

In S5, when it is determined that the rotational speed of the vanes 18 except the assistance of the rotational speed of the vanes 18 reaches the rotational speed equal to or higher than the required torque D (determined as Yes), the process proceeds to S6. At this time, a normal operation switching command signal is transmitted from the determination unit 85 to the normal operation control unit 89.

On the other hand, in S5, when it is determined that the rotational speed of the vanes 18 except the assistance of the rotational speed of the vanes 18 is not equal to or higher than the required torque D (determined as No), the process returns to S4.

Next, in S6, when the rotational speed of the vanes 18 except the assistance of the rotational speed of the vanes 18 reaches the rotational speed equal to or higher than the required torque D, the rotational speed of the vanes 18 is set to the rotational speed at the time of the normal operation (a fourth step).

Subsequently, in S7, the normal operation control unit 89 which receives the normal operation switching command signal is configured to perform the low-pressure setting process of the relief valve 62, the closing process of the on-off valve 55, and the opening process of the switching valve 41, thereby switching to the normal operation (a fifth step). Thereafter, the process shown in FIG. 3 is ended.

According to the starting method of the hydraulic drive train 25 of the present embodiment, by including the first process, the second process, the third process, the fourth process, and the fifth process, the boost pump 48 can supply the hydraulic oil A of the oil tank 44 to the hydraulic pump 31, and it is possible to rotate the first rotating shaft 17 by the action of the vanes 18.

That is, the hydraulic pump 31 supplied with the hydraulic oil A can be made to function as a motor for rotating the first rotating shaft 17.

As a result, since the rotational speed of the vanes 18 rotating together with the first rotating shaft 17 increases, the torque generated by the vanes 18 in the initial stage B at the time of startup can be set to be greater than the required torque D. That is, by compensating for the torque of the vanes 18 in the initial stage B at the time of startup, it is possible to perform startup in the state in which the rotation of the vanes 18 is stabilized.

Further, in the first step, by performing the control of setting the relief valve 62 the high-pressure setting, it is possible to increase the pressure of the oil passage between the boost pump 48 and the hydraulic pump 31 that supply the hydraulic oil. As a result, the torque generated by the rotation of the vanes 18 can be set to be greater than the required torque D.

Furthermore, in the fifth step, by switching the relief valve 62 from the high-pressure setting to the low-pressure setting, since it is possible to reduce the load on the first branching oil passage 46, the power consumption of the hydraulic drive train 25 can be suppressed.

Further, by providing the step of releasing the mechanical brake 75 for restricting the rotation of the vanes 18 between the first step and the second step, it is possible to set the vanes 18 to a rotatable state.

Further, the starting method of the power generator 10 of the present embodiment including the starting method of the hydraulic drive train 25 can obtain the same effect as the above-described starting method of the hydraulic drive train 25.

Further, in this embodiment, the case where the relief valve 62 is switched from the high-pressure setting to the low-pressure setting has been described as an example in the fifth step. However, switching from the high-pressure setting to the low-pressure setting may be performed as necessary, and does not necessarily need to be performed.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10 Power generator
11 Rotating member
11A End plate
12 Fixing member
14 Thrust bearing
15 Radial bearing
17 First rotating shaft
17A, 21A One end
17B, 21B The other end
18 Vane
21 Second rotating shaft
22 Power generator
25 Hydraulic drive train
31 Hydraulic pump
33 Hydraulic motor
35 Supply oil passage
37 Return oil passage
39 Bypass oil passage
41 Switching valve
43 Flow rate adjusting valve
44 Oil tank
46 First branching oil passage
46A, 53A, 59A Distal end
48 Boost pump
49 Check valve
51 Drive motor
52 Third rotating shaft
53 Second branching oil passage
55 On-off valve
57 Check valve
59 Third branching oil passage
62 Relief valve
65 Control device
71 Startup command receiving unit
73 Startup control unit
75 Mechanical brake
81 Rotational speed detection unit
82 Flow speed detection unit
85 Determination unit
87 Storage unit
89 Normal operation control unit
A Hydraulic oil
B Initial stage
C Torque amount
D Required torque
E, F, H Vane generating torque
G Normal operation period
O Axis

What is claimed is:

1. A hydraulic drive train comprising:
a hydraulic pump configured to be rotated by rotation of a first rotating shaft provided with vanes, wherein the first rotating shaft is rotated by the action of the vanes;
a hydraulic motor configured to rotate a second rotating shaft connected to a power generator;
a supply oil passage configured to supply hydraulic oil from the hydraulic pump to the hydraulic motor;
a return oil passage configured to return the hydraulic oil from the hydraulic motor to the hydraulic pump;
a bypass oil passage configured to connect the return oil passage to the supply oil passage;
a switching valve provided in a portion of the supply oil passage located to be closer to the hydraulic motor side than a connection position between the supply oil passage and the bypass oil passage;
a flow rate adjusting valve provided in the bypass oil passage;
an oil tank configured to store the hydraulic oil therein;
a first branching oil passage which is branched from a portion of the return oil passage located to be closer to the hydraulic pump side than a connection position between the return oil passage and the bypass oil passage, and has a distal end reaching the hydraulic oil stored in the oil tank;
a boost pump which is provided in the first branching oil passage and is configured to supply hydraulic oil from the oil tank at a predetermined pressure;
a drive motor configured to drive the boost pump;
a second branching oil passage which is branched from a portion of the return oil passage located to be closer to the hydraulic motor side than a branching position of the first branching oil passage, and has a distal end reaching the hydraulic oil stored in the oil tank;

an on-off valve provided in the second branching oil passage and configured to be capable of closing the second branching oil passage; and a check valve provided in the return oil passage located between the branching position of the first branching oil passage and the branching position of the second branching oil passage.

2. The hydraulic drive train according to claim 1, further comprising:

a third branching oil passage which is branched from a position of the return oil passage between the branching position of the first branching oil passage and the hydraulic pump, and which has a distal end reaching the hydraulic oil stored in the oil tank; and a relief valve which is provided in the third branching oil passage and is configured to open when reaching a predetermined pressure, wherein the relief valve is configured to be able to switch the predetermined pressure between low-pressure setting and high-pressure setting depending on an operating state.

3. The hydraulic drive train according to claim 2, further comprising:

a control device electrically connected to the switching valve, the flow rate adjusting valve, and the on-off valve, wherein the control device is configured to perform a control of closing the switching valve and opening the on-off valve at the time of starting of startup, and is configured to perform a control of setting the relief valve to the high pressure, and the control device is configured to perform a control of opening the switching valve and closing the on-off valve at the time of normal operation after startup, and is configured to perform a control of switching the relief valve to low-pressure setting.

4. A power generator comprising:

the hydraulic drive train according to claim 1;

the vanes configured to be rotated by a fluid;

a mechanical brake configured to restrict a rotation of the vanes;

the first rotating shaft configured to be rotate together with the vanes;

the power generator connected to one end of the second rotating shaft; and the second rotating shaft having the other end connected to the hydraulic motor, wherein the hydraulic drive train is disposed between the first rotating shaft and the second rotating shaft.

5. The power generator according to claim 4, wherein the vanes are rotated by an ocean current.

6. A method of starting a hydraulic drive train, wherein the hydraulic drive train includes a hydraulic pump configured to be rotated by rotation of a first rotating shaft provided with vanes, wherein the first rotating shaft is rotated by the action of the vanes; a hydraulic motor configured to rotate a second rotating shaft connected to a power generator; a supply oil passage configured to supply hydraulic oil from the hydraulic pump to the hydraulic motor; a return oil passage configured to return the hydraulic oil from the hydraulic motor to the hydraulic pump; a bypass oil passage configured to connect the return oil passage to the supply oil passage; a switching valve provided in a portion of the supply oil passage located to be closer to the hydraulic motor side than a connection position with the bypass oil passage; a flow rate adjusting valve provided in the bypass oil passage; an oil tank configured to store the hydraulic oil therein; a first branching oil passage which is branched from a portion of the return oil passage located to be closer to the hydraulic pump side than a connection position with the bypass oil passage, and has a distal end reaching the hydraulic oil stored in the oil tank; a boost pump which is provided in the first branching oil passage and is configured to supply the hydraulic oil from the oil tank at a predetermined pressure; a drive motor configured to drive the boost pump; a second branching oil passage which is branched from a portion of the return oil passage located to be closer to the hydraulic motor side than a connection position with the boost pump, and has a distal end reaching the hydraulic oil stored in the oil tank; an on-off valve provided in the second branching oil passage and configured to be capable of closing the second branching oil passage; and a check valve provided in the return oil passage located between the branching position of the first branching oil passage and the branching position of the second branching oil passage, the method comprising:

a first step of closing the switching valve, setting an opening degree of the flow rate adjusting valve to an initial opening degree and opening the on-off valve at the time of starting of startup of the hydraulic drive train;

a second step of driving the boost pump by the drive motor and supplying hydraulic oil to the hydraulic pump to assist the rotational speed of the vanes with the hydraulic oil;

a third step of controlling the rotational speed of the vanes by adjusting the opening degree of the flow rate adjusting valve;

a fourth step of setting the rotational speed of the vanes to a rotational speed at the time of the normal operation, when the rotational speed of the vanes except the assistance of the rotational speed of the vanes reaches a rotational speed exceeding a required torque; and a fifth step of closing the on-off valve and opening the switching valve to start the normal operation.

7. The method of starting the hydraulic drive train according to claim 6, wherein the hydraulic drive train includes a third branching oil passage which is branched from a position of the return oil passage between a branching position of the second branching oil passage and the hydraulic pump, and has a distal end reaching the hydraulic oil stored in the oil tank, and a relief valve which is provided in the third branching oil passage and configured to open the third branching oil passage when reaching a predetermined pressure, and wherein a control of setting the relief valve to high pressure is performed in the first step, and a control of switching the relief valve to low-pressure setting is performed in the fifth step.

8. A method of starting a power generating device including the method of starting the hydraulic drive train according to claim 6, the method of starting the power generator comprising:

a step of releasing a mechanical brake for restricting a rotation of the vanes between the first step and the second step.

* * * * *